United States Patent [19]

Ohneda et al.

[11] 4,101,929
[45] Jul. 18, 1978

[54] COLOR ENCODING VIDEO SYSTEM WITH OPTICAL LOW PASS FILTER

[75] Inventors: Shoichi Ohneda, Wakayama; Yukio Okano, Osaka, both of Japan

[73] Assignee: Minolta Camera Kabushiki Kaisha, Osaka, Japan

[21] Appl. No.: 768,869

[22] Filed: Feb. 15, 1977

[30] Foreign Application Priority Data

Feb. 20, 1976 [JP] Japan .................................. 51-16977

[51] Int. Cl.² .............................................. H04N 9/07
[52] U.S. Cl. ......................................... 358/44; 358/55
[58] Field of Search .............................. 358/55, 41, 44

[56] References Cited
U.S. PATENT DOCUMENTS 3,940,788  2/1976  Abe et al. ........................ 358/55 X Primary Examiner—Robert L. Richardson
Attorney, Agent, or Firm—Harold L. Jackson; Stanley R. Jones; Joseph W. Price

[57] ABSTRACT

A color encoding video system such as a single or double tube color television camera has an optical grating low pass filter positioned in a plane substantially adjacent the focal plane of the image pickup tube. A separate and interchangeable image forming objective optical system can be mounted on the body of the camera for focusing an object scene on the photosensitive element of the pickup tube. The filter grating pattern can be stripes or lenticular lenses and has a spatial frequency along the scanning direction limited to a value not greater than the highest spatial frequency available for detection of the luminous signals whereby optical imaging problems are prevented regardless of the aperture opening of the objective optical system.

12 Claims, 9 Drawing Figures

COLOR ENCODING VIDEO SYSTEM WITH OPTICAL LOW PASS FILTER

BACKGROUND OF THE INVENTION

1. Field of the Invention

The present invention relates to a color encoding video system utilizing an optical low pass filter and more particularly to an improved color encoding video system that is independent of the aperture opening of any ancillary image forming optical system utilized therewith.

2. Description of the Prior Art

In the field of single or double tube color television systems, a luminous signal and chromatic signals are derived from an object scene that has been imaged onto a color encoding filter by an objective lens system. The color encoding filter spatially modulates the image to generate respective chromatic signals for the separate colors that form the composite image. In general, the carrier frequency for the chromatic signals are dependent on the pitch of the stripes in the color encoding filter as measured along the scanning direction of an image pickup tube.

The prior art color encoding filters that are generally utilized can be classified into a two-color encoding and three-color encoding type. The accompanying electronic circuitry is capable of separating and processing the signals and is generally classified as either a frequency separating type or a phase separating type. In either case, when the image of the object scene includes a high-frequency component such as striped pattern having a spatial frequency close to that of color encoding filter, so that a high frequency component can be generated which would fall into a carrier frequency band of chromatic signals, then this high frequency component will interfere with the chromatic signals and produce false color signals for transmission and ultimately formation on a television screen. Numerous attempts have been made to efficiently eliminate such false chromatic signals for example, by placing an optical low pass filter in the optical system of the color television camera. The filter being capable of cutting off a high frequency component of the scene light before it impinges upon the photosensitive element of the image pickup tube.

Various examples of these optical low pass filters of a phase grating type can be found in the prior art such as U.S. Pat. No. 3,756,695 and Japanese Patent publication Nos. SHO49-20553 and SHO48-53472. Other examples of phase grating type optical low pass filters are disclosed in U.S. Pat. Nos. 3,911,479, 3,821,795, 3,681,519 and 2,733,291 and German publication DOS2,163,443.

The prior art has also utilized double refraction birefringent type low pass optical filters as disclosed in U.S. Pat. No. 3,588,224, German publication DOS2,027,035 and the Japanese utility model publication No. SHO47-18688.

Of general interest, is the disclosure in U.S. Pat. Nos. 3,875,627, 3,768,888, 3,566,016, 3,910,683 and 3,912,962.

Additionally, the prior art has attempted to use optical phase grating filters having various arrangement of their grating such as in an orderly alignment and in a random alignment. Many of these optical phase grating filters do have the capability of cutting off a high frequency component from the object scene as it is imaged through a particular optical lens system. However, these optical filters are generally mounted intricately in the optical lens system. As can be expected, the resulting cutoff frequency will be subjective to the particular type of color encoding system utilized in that color television camera. This subjectivity means that the objective lens system can only be used on a particular color encoding video system and if it is desirable for the objective lens system to be replaced, or to be used on another camera body requring a different cutofff frequency, then the optical low pass filter would not function properly. Thus, the prior art has frequently found that it is not possible to interchange objective lens systems on different camera bodies.

To date, the prior art has not provided a highly adaptable color encoding video system with an optical filter that is capable of removing optical aberrations within the constraints of an economical production of the optical filter and being independent of the objective lens system.

SUMMARY OF THE INVENTION

It is an object of the present invention to provide an improved optical system for a single or double tube color television camera which includes a phase grating type optical low pass filter positioned in close vicinity to an image surface of the pickup tube and which further prevents any shadow of the phase gratings from appearing on the image plane even if the diaphragm of the objective optical system is stopped down.

The color encoding video system includes an image forming optical system, means for mounting the optical system, a color encoding filter operatively associated with the optical system for producing appropriate chromatic signals and a photosensitive element positioned approximately at the focal plane of the objective optical system and scanned for producing signals representative of both the luminous intensity and chromatic values of an object image thereon.

An optical grating low pass filter is positioned on a plane substantially adjacent a focal plane containing the photosensitive element. The grating pattern of the optical filter has a spatial frequency along the scanning direction limited to a value not greater than the highest spatial frequency available for detection of luminous signals of the object imaged on the photosensitive element. Thus, the present invention establishes its objectives by maintaining a relationship between the maximum spatial frequency, $fO$, of a luminous signal and the spatial frequency of the grating of an optical low pass filter, $fG$, as follows:

$$fO \leq fG$$

Additionally, it is desirable that the spatial frequency of the grating, $fG$ has the following relationship to the spatial frequency of the color encoding grating, $fS$:

$$fS \leq fG$$

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

The following description is provided to enable any person skilled in the optical design and video transmission art to make and use the invention and it sets forth the best modes contemplated by the inventors of carrying out their invention. Various modifications, however, will remain readily apparent to those skilled in the above arts, since the generic principles of the present invention have been defined herein specifically to provide a relatively economical and easily manufactured color encoding video system incorporating an improved optical low pass filter.

The disclosure material of the Kell U.S. Pat. No. 2,733,291, issued Jan. 31, 1956; Larsen et al U.S. Pat. No. 3,681,519, issued Aug. 1, 1972 and Abe et al U.S. Pat. No. 3,940,788 issued Feb. 24, 1976, is incorporated herein by reference in accordance with the provisions of the Manual of Patent Examining Procedure 608.01(p) to supplement the present disclosure.

Figure 1:
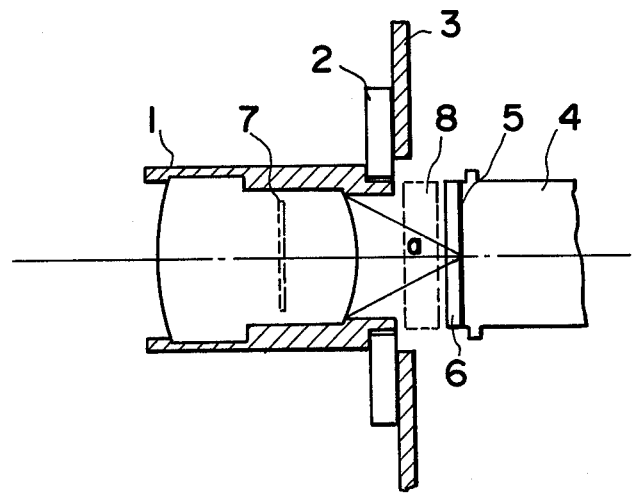
FIG. 1 is a partial schematic cross-sectional view of a conventional color television camera illustrating the position of a prior art optical grating low pass filter within the objective optical system and further a double refraction type optical low pass filter on the image side of the objective optical system.

FIG. 1 illustrates a schematic conventional color encoding video system wherein an optical low pass filter is built into the objective optical system. The objective lens system 1 is mounted onto a television camera body 3 through a lens mount 2. Mounted intricately into the objective lens system is the optical low pass filter 7, as shown in phantom lines. The objective lens system 1 is capable of focusing an image onto a color encoding filter 5, that is positioned on the faceplate 6 of the image pickup tube 4. As known in the prior art, the color encoding filter can produce representative chromatic signals while the low pass filter 7 can eliminate high frequency false signals of color information.

As can be appreciated by those skilled in the art, the resulting image is scanned and the luminous and chromatic signals are detected and processed by appropriate electrical circuits as noted in the above incorporated by reference subject matter. As can be readily appreciated, the optical phase grating filter 7 will have charcteristics that are subjective to the specific television camera such as its design cutoff frequency.

Figure 2:
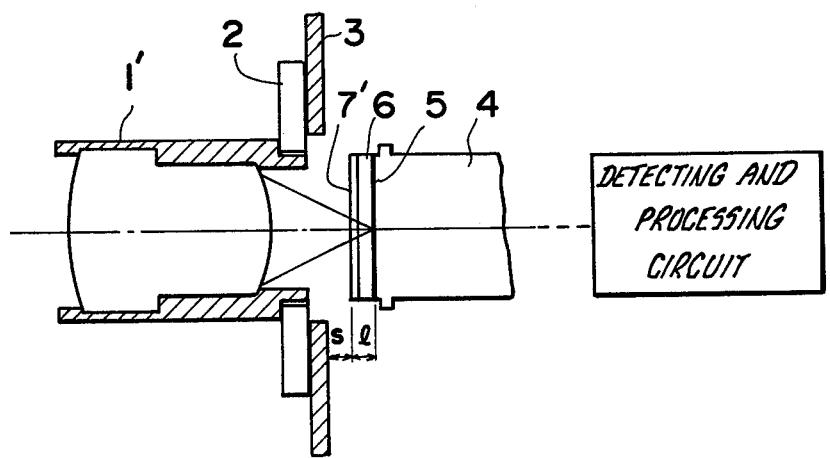
FIG. 2 is a partial schematic cross-sectional view of a color television camera incorporating an optical grating low pass filter in accordance with the present invention.

With an optical phase grating filter 7', of the present invention, positioned as shown in FIG. 2, an objective lens system 1' is independent of the subjective characteristics of the optical phase grating filter 7' and can thereby be replaceable as desired. Additionally, there is no problems created by the imaging of a shadow of the filter stripes even when the aperture of the objective lens system 1' is stopped down. This condition occurs, however, in accordance with the present invention, only if the pitch of the filter phase grating stripes provides a spatial frequency, fG, along the scanning direction which is equal to or less than the maximum spatial frequency, fO, of the luminous signal, Y, transmitted through the filter such as follows;

$$fO \leq fG \tag{1}$$

Figure 5:
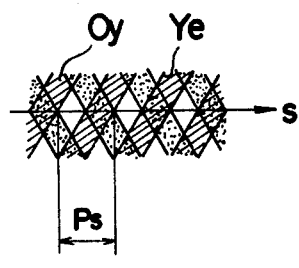
FIG. 5 is a plan view of a color encoding stripe filter capable of producing the plot of FIG. 3.
Figure 6:
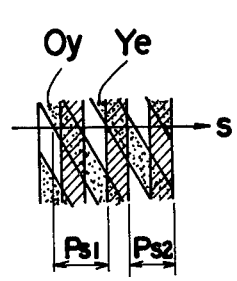
FIG. 6 is a plan view of a color encoding strip filter capable of producing the plot of FIG. 4.

Both of the color encoding filters disclosed in FIGS. 5 and 6 use crossing cyan and yellow stripes that derive a chrominance signal component by modulating the light into oscillation in a high frequency range.

Figure 3:
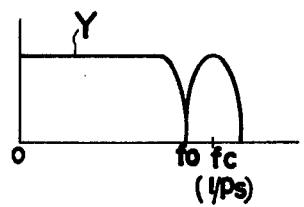
FIG. 3 is a plot of the frequency band of the luminous signal and a chromatic signal in a one frequency vertically correlated phase separating system.

FIG. 3 discloses a plot of amplitude versus frequency in megacycles to illustrate the frequency bands occupied by the various signals derived by the image pickup tube. FIG. 3 refers to a single frequency band vertical co-relating phase separating type and FIG. 5 discloses a plan view of the respective color encoding stripe filter.

Figure 4:
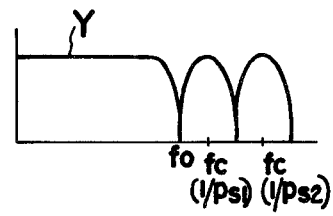
FIG. 4 is a plot of the frequency bands of a luminous signal and a chromatic signal in a two frequency, frequency separating system.

FIG. 4 refers to the signal characteristic of a two frequency band, frequency-separating type and the respective color encoding stripe filter is shown in FIG. 6. Additional background material can be found in U.S. Pat. No. 2,733,291 and specifically in Column 6 through Column 9.

With reference to FIG. 3, the red component and blue component of the object scene are modulated into a frequency fC, through the stripe color filter. Similarly as shown in FIG. 4, a red component can be modulated into fcR and a blue component can be modulated into fcB. In both of the disclosed color encoding filters, a component of the luminous signal Y, is shown as being within a range of frequency between 0, and fO.

The actual maximum frequency, fO, which limits the range of a carrier frequency band for the luminous signal Y is further subject to limitations arising from an electrical low pass filter in the detecting and processing circuitry of the camera. More particularly, an object image or part thereof having a frequency higher than the maximum frequency fO, of the luminous signal in a single tube color television camera cannot be electrically resolved and processed.

The present inventors observed that when a prior art optical low pass filter of a phase grating type was positioned in close vicinity to the image surface of the pickup tube that the spatial frequency of a shadow of the gratings appeared when the diaphragm for the objective lens system was stopped down to a small aperture. Experiments disclosed that the spatial frequency of the shadow had the same spatial frequency as the phase grating itself. The present inventors found that by specifically limiting the spatial frequency of a phase grating optical low pass filter that the spatial frequency of a shadow of the grating could be cut off. This was found to specifically occur when the spatial frequency, fG, for the phase grating optical low pass filter had a frequency higher than the maximum frequency, fO, of the luminous signal Y.

As known in the prior art, the frequency spectrum in a television camera is generally expressed in megahertz. However, if the scanning speed in an image pickup tube is known, then the megahertz frequency can be converted into a spatial frequency (lines/mm). Accordingly, the frequency spectrum will hereinafter be described in terms of the spatial frequency.

Figure 7:
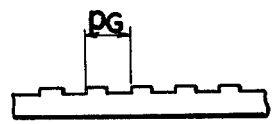
FIG. 7 is a longitudinal cross-sectional view of an optical phase grating low pass filter.

FIG. 7 discloses a cross-sectional view of gratings in a phase grating optical low pass filter that is applicable in the present invention. Theoretically assuming a pitch for the gratings of PG, then the spatial frequency fG, of the gratings will be as follows;

$$fG = 1/PG \qquad (2)$$

Additionally, the present invention as established above must adhere to the relationship;

$$fO \leq fG \text{ (frequency/mm)} \qquad (1)$$

wherein, fO is the maximum frequency (line/mm) of a luminous signal.

When a phase grating optical low pass filter satisfying the above equation (1) is positioned in close vicinity to the image surface of a pickup tube and a diaphragm for an accompanying objective lens system is stopped down to a small aperture, the prior art shadow of gratings is eliminated.

However, if a conventional optical phase grating filter 7, as shown in FIG. 1, is attempted to be moved out of its objective lens system 1, and placed into a position represented by the dotted line, at a, that is in relatively close vicinity to the faceplate 6, the shadow problem exists on the image surface. Recognizing this problem, the prior art has usually attempted to position the phase grating optical low pass filter away from the image surface.

A double refraction optical low pass filter can be positioned in close vicinity to an image surface without producing a shadow. Generally, a double refraction optical low pass filter such as indicated by symbol 8, in FIG. 1 consists of a quartz plate of about 6mm, so that the center of the filter 8 is often positioned at point a. This form of filter, however, cannot achieve the cutoff function of an optical low pass filter for polarized light and a polarizing filter cannot be used with a double refraction optical low pass filter. Additionally, when a color-temperature compensating filter or the like is used on the object side of the television camera, then the double refraction plate and the color temperature compensating filter must be accommodated in a relatively limited space, thereby creating considerable difficulties in attaching these optical members within the video system.

Again referring to FIG. 2, an embodiment of the present invention is disclosed wherein the optical low pass filter 7', can be positioned directly on the faceplate 6 of the image pickup tube 4. A color encoding filter 5 is positioned on the image side of the faceplate 6. The objective lens system 1 can be removably mounted by the mounting plate 2 onto the camera body 3. The optical phase grating filter 7' can be positioned a distance L, from the color encoding filter 6 and further a distance S, from the camera body 3. The effective plane of the optical filter 7' can be considered to be the surface of the substrate since the phase grating stripes have a relatively small height.

The value of the maximum frequency of the luminous signal varies according to the type of image pickup system of a single television televison camera and the method of adjusting the maximum frequency. However, the spatial frequency fG of the filter grating should be equal to or higher than the spatial frequency (fS = 1/PS) of a color encoding stripe filter in a single tube type television camera. If we assume a pitch, PS, in a horizontal scanning direction S, as shown in FIG. 5 which further comprises the individual pitches PS1 and PS2 in the horizontal scanning direction, then the relationship;

$$fS \leq fG \qquad (2)$$

will be satisfied, wherein fS is the spatial frequency of the grating having the pitch PS.

Experiments have established that a good result is achieved when equation (2) is satisfied for each transmitted color of light. If the chromatic signal is of a two frequency separating type as disclosed in FIG. 4, then the lowest frequency of the stripe filter in the scanning direction S should be adopted. In other words, referring to FIG. 6, the frequency for the period PS1 should be selected and with reference to FIG. 4, fcR should be selected as fS.

FIG. 7 discloses one embodiment of the present invention wherein a rectangular wave phase grating is disclosed with the phase retarding portions capable of providing a phase difference $\lambda = \pi$ for light of a wavelength of 550m$\mu$. The spatial cutoff frequency fO for the luminous signal is 12.5 lines/mm with a grating period P equal to 0.06mm. The spatial frequency of the grating is 16.7 lines (millimeter) with a phase width (a) of 0.015mm. When a grating having these parameters is positioned relative to the image pickup tube so that the grating plane and the image plane is about 2.2mm, then the grating can cutoff the high frequency component of the scene light while eliminating any appearance of shadow of the gratings even if the diaphragm of the objective lens system is stopped down to a minimum aperture. This embodiment provides a one dimensional rectangular wave phase grating in which the direction of the grating is positioned perpendicular to the scanning direction. If it is necessary to space the distance of the plane of the grating further from the image plane of 2.2mm, then the direction of the grating may be inclined from a direction perpendicular to the scanning direction so that the apparent value of spatial frequency fG, relative to the scanning direction becomes smaller while the actual spatial frequency fG of the grating itself remains constant. This inclination permits the gratings to be positioned at a larger distance from the image plane while providing the same result. It is also possible by inclining the grating plane to the perpendicular direction to eliminate Moire patterns which are sometimes produced between the color encoding stripe filter and the low pass optical filter. This advantage, however, is subjective to the direction of the striped color encoding filter.

Our optical low pass grating filter must satisfy the above equation (1) and preferably also equation (2) in accordance with the parameters of the present invention. Since the pitch PG of the grating period as shown in FIG. 7 is relatively small, the grating itself can be positioned extremely close to the image pickup plane.

Figure 8:
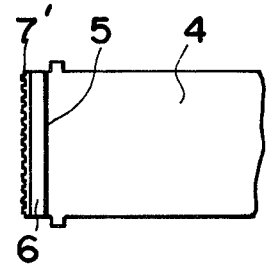
FIG. 8 is schematic side view showing one example of the present invention wherein the optical phase grating low pass filter is directly bonded to a faceplate of the image pickup tube.

For example, in a pickup tube that incorporates a color encoding striped filter on the faceplate, it is possible for the optical low pass filter 7' of the present invention as shown in FIG. 8, to be bonded or cemented directly to the surface of the faceplate 6.

As an additional example, if the phase grating filter is designed for a retardation of $\lambda = \pi$; a grating period of 0.06mm; a spatial frequency of the grating being 16.7 lines/per millimeter; a width of each phase retarding stripe portion being 0.03 millimeters, and this phase grating filter is positioned at a distance of 1.7mm in air from the faceplate of the image pickup tube, then the grating filter will serve as an optical low pass filter having an OTF (Optical Transfer Function) of zero at a spatial frequency of 16 lines/mm. It should be noted that the distance from the image plane of the pickup tube was stated in terms of air length. In actuality, the air is an equivalent optical distance from an actual embodiment. For example, if the thickness of the faceplate of the pickup tube is about 2.5mm with a glass refractive index of roughly 1.5, then this thickness can be converted into an equivalent air length of about 1.7mm. Thus, an optical phase grating filter of these parameters can be positioned directly on the faceplate of the pickup tube and utilized as an optical low pass filter.

Figure 9:
FIG. 9 is a cross-sectional view of a lenticular lens system comprising a series of convex ridges arranged parallel to each other.

While the above description discloses the parameters of two embodiments of the present invention, it should be realized that other forms of optical low pass filters of the type set forth in U.S. Pat. No. 3,756,695 and Japanese patent publication No. SHO48-53742 can be utilized if they satisfy the above equations (1) or (2). Additionally a lenticular lens filter disclosed in FIG. 9 of a type further described in U.S. Pat. No. 3,940,788 can be utilized in the present invention.

The above embodiments have been directed to a one-dimensional rectangular phase grating. The present invention may be applied to other optical low pass filter gratings such as an amplitude type having alternate and parallel stripes of different transmissivity, complex amplitude gratings and wave length dependent gratings. It should be noted that the present invention is by no means limited to one-dimensional grating but may be applied to a two-dimensional grating and a combination of a one-dimensional grating with a two-dimensional grating superimposed on each other.

Accordingly the present invention permits a phase grating optical low pass filter to be positioned in a video encoding system out of the objective lens system and in close vicinity to the image pickup plane.

Additionally, the contour of the filter can be considerably reduced in thickness as compared with the double refractive effect type low pass filter thereby permitting sufficient room to permit the mounting of other filters such as a color temperature compensating filter.

While the preferred embodiments of the present invention have been described herein, it should be recognized that a person skilled in this field can readily modify an actual filter once given the teachings of the present invention, and therefore receive its benefits.

What is claimed is:

1. In a color encoding video system having an image forming optical system, means for mounting the optical system, a color encoding filter operatively associated with the optical system for producing a representative color signal, a photosensitive element positioned approximately at the focal plane of the optical system and scanned for producing signals representative of both the luminous intensity and chromatic values of an object imaged thereon and scanning means for detecting and processing the luminous and chromatic signals, the improvement comprising:

an optical grating low pass filter positioned in a plane substantially adjacent the focal plane containing the photosensitive element, the grating pattern having a spatial frequency along the scanning direction limited to a value not greater than the highest spatial frequency available for detection of luminous signals of the object imaged on the photosensitive element by the means for detecting.

2. The invention of claim 1 wherein the image forming optical system is interchangeably mounted on the mounting means.

3. The invention of claim 1 further including an envelope faceplate covering the photosensitive element and positioned between the optical low pass filter and the photosensitive element.

4. The invention of claim 3 wherein the optical low pass filter is attached to the faceplate.

5. The invention of claim 1 wherein the optical low pass filter is of a phase grating type.

6. The invention of claim 1 wherein the optical low pass filter is of an amplitude type having alternative parallel stripes of different transmissivity.

7. The invention of claim 2 wherein the optical low pass filter is of a complex amplitude grating type.

8. The invention of claim 1 wherein the spatial frequency of the optical grating pattern is not less than the spatial frequency of the grating pattern of the color encoding filter taken along the scanning direction.

9. The invention of claim 8 wherein the color encoding filter has a grating pattern producing at least two chromatic signals and the respective pitch of each grating strip is the same.

10. The invention of claim 8 wherein the color encoding filter has a grating pattern producing at least two chromatic signals and the characteristic pitch of each color producing grating strips is different, the spatial frequency of the grating pattern of the optical low pass filter being not less than the spatial frequency of the largest pitch of the grating pattern of the color encoding filter.

11. In a single or double tube color television camera system having an image forming optical system, a color encoding filter operatively associated with the optical system for producing a representative optical chromatic signal, and an image pickup tube having an envelope faceplate whereby the image of an object scene is realized and scanned in one direction to generate luminous and chromatic signals representative of the object scene, the improvement comprising;

an optical striped grating low pass filter positioned adjacent the faceplate, on the image forming optical system side of the faceplate and providing an upper cutoff frequency, the grating pattern having a spatial frequency in the scanning direction of not greater than the cutoff frequency, the axis of the stripes forming an angle with a plane perpendicular to the scanning direction.

12. An improved color television camera optical encoding system for imaging both chromatic and luminous signals on a photosensitive element protected by a transparent faceplate comprising;

a camera housing member;

a removable objective lens assembly attached to the housing member for focusing an image on the photosensitive element, and an optical low pass filter mounted apart from and on the image side of the objective lens assembly, adjacent the faceplate, the optical filter including a grating pattern having a spatial frequency along one direction limited to a value not greater than the highest spatial frequency available for detection of luminous signals of the object imaged on the photosensitive element, whereby the resultant image formed on the photosensitive element is independent of any optical shadows generated by a stopped down aperture of the objective lens.

* * * * *

UNITED STATES PATENT AND TRADEMARK OFFICE
CERTIFICATE OF CORRECTION

PATENT NO. : 4,101,929

DATED : July 18, 1978

INVENTOR(S) : Shoichi Ohneda and Yukio Okano

It is certified that error appears in the above-identified patent and that said Letters Patent are hereby corrected as shown below:

Column 1, line 33, delete "of color" and insert --of the color--.

Column 6, line 5, delete "television television" and insert thereof --tube television--.

Column 7, line 59 before "What is claimed is:" insert the sentence --Accordingly the parameters of the present invention should be measured solely from the following claims in which we claim.--

Signed and Sealed this

Twenty-seventh Day of February 1979

[SEAL]

Attest:

RUTH C. MASON
Attesting Officer

DONALD W. BANNER
Commissioner of Patents and Trademarks